Figure 1:
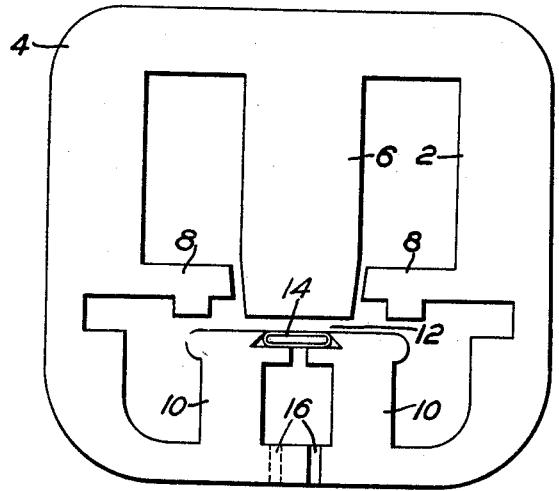

Sept. 5, 1933.     T. D. BARNES     1,925,860
ELECTRICAL INSTRUMENT
Filed March 18, 1932     2 Sheets-Sheet 1

WITNESSES:
*P. J. Fitzgerald*
*F. H. Miller*

INVENTOR
*Thomas D. Barnes.*
BY *J. W. Saltzman*
ATTORNEY

Sept. 5, 1933.                    T. D. BARNES                    1,925,860
                               ELECTRICAL INSTRUMENT
                             Filed March 18, 1932        2 Sheets-Sheet 2

WITNESSES:                                              INVENTOR
                                                    Thomas D. Barnes.
                                                    BY
                                                         ATTORNEY Patented Sept. 5, 1933

1,925,860

UNITED STATES PATENT OFFICE 1,925,860

ELECTRICAL INSTRUMENT

Thomas D. Barnes, Newark, N. J., assignor to Westinghouse Electric & Manufacturing Company, a corporation of Pennsylvania Application March 18, 1932. Serial No. 599,658

4 Claims. (Cl. 171—264)

My invention relates to electrical instruments and particularly to instruments of the watt-hour meter type.

One object of my invention is to control the load characteristics of an instrument, of the above-indicated character, in order to eliminate undesirable features, such as that represented by the dip in the registration curve of a watt-hour meter at approximately twenty per cent of its full-load rating.

Another object of my invention is to provide identical parts which may be variously assembled in a plurality of similar instruments to render the instruments of desirably different corresponding operating characteristics.

Another object of my invention is to provide an instrument that shall have accurately related parts, without the requirement for the exercise of undue skill in effecting the relationship.

Another object of my invention is to obtain the above indicated results without necessarily materially altering the appearance, size and construction of a usual standard instrument not embodying the improvement.

A further object of my invention is to provide an instrument that shall be simple and durable in construction, economical to manufacture and effective in its operation.

Watt-hour meters are constructed and calibrated in accordance with the service for which they are adapted, but they operate somewhat inaccurately at loads very low or very high in relation to their rating. In other words, whether a meter be rated at five, ten, or a hundred amperes, it will operate correctly at loads within a wide range of its rated load, but will be somewhat incorrect at, for example, twenty per cent and three hundred per cent of its rated load.

Usually a meter is operated within the correct range of its rated load, so that, in many applications, the errors mentioned are of little consequence.

However, it is desirable, particularly for certain applications where the load varies widely, to have the meter as accurate as possible over all load ranges.

The above-mentioned errors, although inherent and mostly hyperphysical, as in the changed flux-phase relations caused by saturation, flux distribution, and varying reluctance, are augmented by more tangible features, such as friction between, and the balance and symmetry of, physical parts.

The physical or material changes which may be made to improve the hyperphysical effects are not always of a commercially effective nature, because of manufacturing cost and space considerations, or of the skill and time required to effect them.

It is, therefore, one of the purposes of my invention to improve the low-load hyperphysical errors in a strictly commercial way, as by only slight changes of the parts of a present standard meter which may be made without the exercise of undue skill, the expenditure of undue time or the addition of undue material.

For instance, in changing the reluctance of a given magnetizable core member, it is obvious, in effecting such result, to change the cross-sectional area of the core. However, to do this in any of the obvious ways, as by cutting away a portion of the core at a particular place, by adding material at this place, or by introducing a minute air gap, much skill is required.

In one aspect of my invention, such a change is effected to a high degree of accuracy by merely reversing the relative positions of parts, as will hereinafter appear. This feature of the reversal of parts is augmented by the feature of grouping the parts in any of various permissible ways to provide a high degree of selectivity of reluctance values, so that several core members of identical component elements may be of substantially different reluctance values at corresponding parts thereof.

Figure 2:
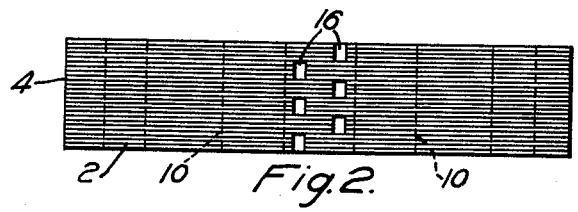
Figure 3:
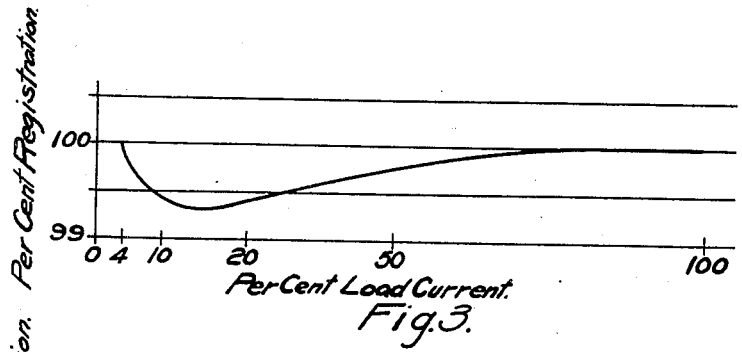
Figure 4:
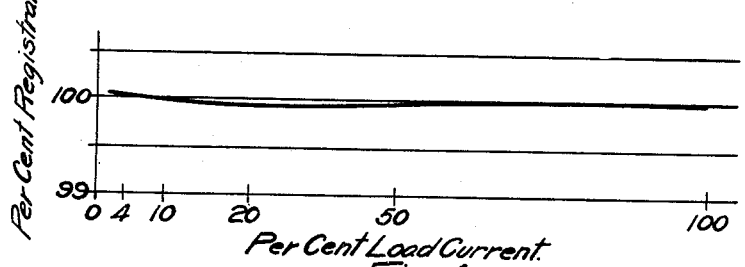

In the accompanying drawings:

Figure 1 is a view, in side elevation, of a watt-hour meter core embodying my invention, Fig. 2 is a view, in bottom plan, of the core shown in Fig. 1, Fig. 3 is a diagram, indicating a representative registration curve of an ordinary watt-hour meter not embodying my invention, Fig. 4 is a view, similar to Fig. 3, indicating the character of improvement in registration effected by the structure of Figs. 1 and 2 over the registration indicated in Fig. 3.

Figure 5:
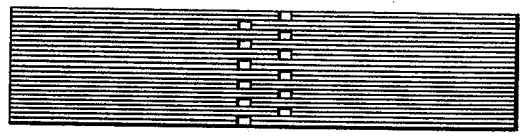
Figure 6:
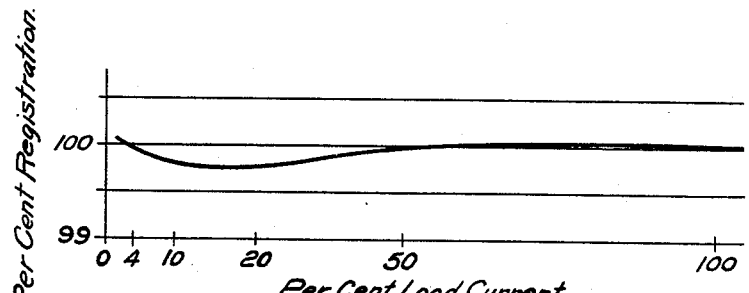
Figure 7:
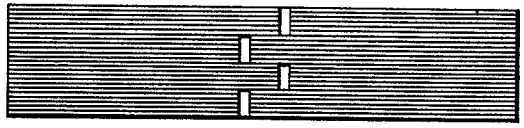
Figure 8:
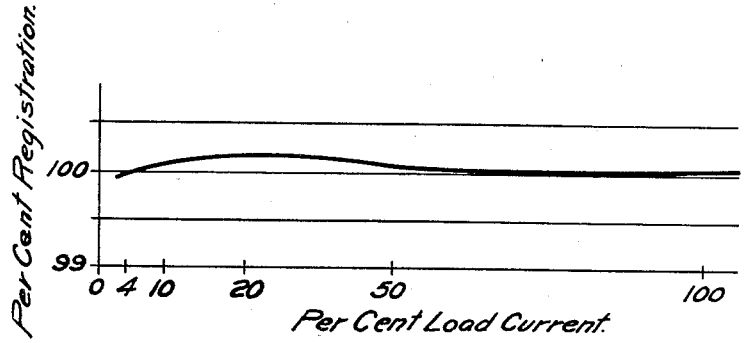

Figs. 5 and 7 are plan views, similar to Fig. 2, of modified forms of the invention, and Figs. 6 and 8 are diagrams similar to Figs. 3 and 4, of registration curves obtained by meters having cores constructed in accordance with the modifications of Figs. 5 and 7, respectively.

Referring to Figs. 1 and 2, a composite core 2 of the actuating electromagnet of a watt-hour meter comprises a stack of component elements, or flat soft iron laminations, each substantially in the form of a loop having an outer perimetral portion 4. A shunt pole leg 6, side legs 8 and series poles 10 project inwardly toward each other from the perimeter 4 to provide a gap 12 for the reception of an armature disk in a usual and well known manner. An overload shunt 14 is disposed between the series legs 10.

The core, as so far described and as viewed in Fig. 1, is similar in construction to a watthour meter core of usual character.

My invention comprises the provision of gaps 16 in the perimeters of the core laminations and a reverse-face relation of the laminations singly or in groups, as follows:

The laminations of the core are formed, as by punching, to be identical in contour, with the gap 16 of each at the same side of a center line parallel to, and between, the series legs 10.

In the construction of Figs. 1 and 2, the punchings are taken in groups of four, with the gaps 16 of the individual punchings of each group at the same side of the above-mentioned center line. The groups are turned one hundred and eighty degrees, or in reverse-face relation to each other, and the core built up, with the gaps 16 of certain of the punchings laterally opposite solid or ungapped portions of other punchings.

Instead of the open gaps 16, the laminations may be initially constructed with inserts of different reluctance values from the material of the punchings which they displace and, in any of these constructions, provide the core, between the series legs 10, with a plurality of local or staggered zones of different reluctance values from zones adjacent thereto. Also, the gaps, as viewed in Fig. 2 may be of various lengths parallel to the laminations, or in the direction of the perimeter of the loop, and it is comprehended that, for certain applications, the right-hand edge or edges of one or more of the left-hand gaps, as viewed in Fig. 2 may be disposed to the right beyond the left-hand edge or edges of one or more of the right-hand gaps, or the gaps and laminations modified and arranged singly or in groups in any of various permissible ways.

The normal light load characteristic curve of a usual watt-hour meter, including an overload compensating shunt, is somewhat on the order of the curve illustrated in Fig. 3, showing a droop at about fifteen per cent load current of very objectionable character from an accuracy viewpoint.

The structure of Figs. 1 and 2 of my invention, produces a very satisfactory curve, as illustrated in Fig. 4, for single-phase meters.

However, certain other meters have greater frictional torque and, by stacking the laminations, as by groups of two as illustrated in Fig. 5, a satisfactory curve, on the order of that shown in Fig. 6, may be obtained.

For special applications, some such grouping as illustrated in Fig. 7 may be provided to produce a curve on the order of that illustrated in Fig. 8.

My invention provides extremely flexible control over the production of meters and other devices having widely varying characteristics, without the delay of tool change, the necessity for carrying stocks of different elements, the requirement for delicate operations and the disadvantages of other features of prior similar devices.

While I have shown and described various forms of my invention, these are merely for purposes of illustration and it is comprehended that many other forms may be effected without departing from the spirit and scope of the invention as set forth in the appended claims.

I claim as my invention:

1. In combination, in an electrical instrument, a core comprising laminations having zones eccentric to centers at corresponding sides thereof of different reluctance values from adjacent zones and disposed with corresponding sides facing in opposite directions.

2. In combination, in an electrical instrument, a core comprising laminations arranged in groups and having zones eccentric to centers at corresponding sides thereof of different reluctance values from adjacent zones, the laminations of one group facing in opposite directions to the laminations of another group.

3. In combination, in an instrument, a core comprising a pair of pole legs and including laminations having zones eccentric to a center line parallel to, and between, said legs at corresponding sides of the laminations of different reluctance values from adjacent zones and disposed with corresponding sides facing in opposite directions.

4. In combination, in a watt-hour meter, a laminated core loop having an inwardly projecting shunt-pole leg and a pair of oppositely inwardly-projecting series-pole legs parallel to said shunt leg symmetrically at opposite sides thereof, certain of said laminations being grouped and each group providing a gap in the perimeter of the loop eccentric to a center line in the plane of the loop parallel to, and between, the series legs, corresponding sides of the laminations of one group facing in the same direction and opposite to the direction faced by the sides of another group, the gaps of said one and said other group being oppositely eccentric to said center line.

THOMAS D. BARNES.